United States Patent
Fuchigami et al.

[11] Patent Number: 5,146,222
[45] Date of Patent: Sep. 8, 1992

[54] METHOD OF CODING AN AUDIO SIGNAL BY USING CODING UNIT AND AN ADAPTIVE ORTHOGONAL TRANSFORMATION

[75] Inventors: Tokuhiko Fuchigami, Yokohama; Masaya Konishi, Yokosuka; Sadahiro Yasura, Ota; Yasuhiro Yamada, Yokosuka, all of Japan

[73] Assignee: Victor Company of Japan, Ltd., Yokohama, Japan

[21] Appl. No.: 597,700

[22] Filed: Oct. 17, 1990

[30] Foreign Application Priority Data

Oct. 18, 1989 [JP] Japan .................................. 1-271011

[51] Int. Cl.$^5$ ............................................. H03M 7/36
[52] U.S. Cl. ...................................................... 341/76
[58] Field of Search ..................... 341/200, 76; 381/31, 381/46

[56] References Cited

U.S. PATENT DOCUMENTS

| | | | |
|---|---|---|---|
| 4,815,134 | 3/1989 | Picone et al. | 381/31 |
| 4,894,713 | 1/1990 | Delogne et al. | 358/135 X |
| 4,918,734 | 4/1990 | Muramatsu et al. | 381/46 |
| 4,942,607 | 7/1990 | Schröder et al. | 381/31 |

*Primary Examiner*—Sharon D. Logan
*Attorney, Agent, or Firm*—Fleit, Jacobson, Cohn, Price, Holman & Stern

[57] ABSTRACT

A coding unit for coding an audio signal by using an adaptive orthogonal transformation and a coding method comprises calculating the sum total of power of an input audio signal in a time duration of an orthogonal transform length or over the length, adaptively controlling the minimum audible level as a threshold level corresponding to the power level on a frequency axis after the orthogonal transformation or on a time axis before the orthogonal transformation, excepting samples having a power level under the threshold level from orthogonally transformed samples and quantizing remaining samples. The threshold level of the minimum audible level is adaptively controlled corresponding to an observed level of an input audio signal. Even if the input audio signal has various power levels, it is possible to usually set the adaptively audible value (the threshold level), thereby effectively reducing a coding amount.

3 Claims, 4 Drawing Sheets

METHOD OF CODING AN AUDIO SIGNAL BY USING CODING UNIT AND AN ADAPTIVE ORTHOGONAL TRANSFORMATION

BACKGROUND OF THE INVENTION

The present invention relates to a coding unit and method of coding an audio signal by using orthogonal transform by using an adaptive transformation such as a discrete cosine tansformation (DCT), a discrete Fourier transformation (DFT) and the like, and more particularly to a coding unit and method in which a minimum audible acoustic level is set to a predetermined value adaptive to a power level for reducing a coding rate.

When an audio signal is compressed and coded, a conventional system excepts "an unnecessary component" of the signal component as being inaudible for effectively reducing a code rate.

A person having normal hearing ability can generally hear sounds within the area enclosed by two lines representing the maximum and minimum audible levels, respectively. This audible area is illustrated in FIG. 1 as an area with hatching. Accordingly, signals representing sounds under the minimum audible level can be ignored.

A signal on the time axis is transformed on a frequency axis by the orthogonal transformation and this resultant coefficient may distribute from a full scale value (if 16 bit data, it is $2^{15}$) to an operational accuracy value. In the conventional method, the full scale value is set to the maximum audible level (120 dB Sound Pressure Level —S.P.L.—) and the minimum audible level (about 0 dB S.P.L. at 1 kHz) is determined according to the maximum level, as shown in FIG. 1, and samples (coefficient) under the minimum audible level are omitted. However, it is very rare for actual music signals to hit an upper value of the full scale.

Accordingly, when a signal source having an average of a signal level at about 60 dB which is calculated on the time axis or the frequency axis, is set to 80 dB S.P.L. of an average at reproduction, as shown in FIG. 2(a), an oblique lined portion omitted in coding as an inaudible sample, is as shown in FIG. 2(b) at an actual reproduction, so that a part of the actual audible portion is lost. Namely, an average power dB that is calculated in a time range, can be used in a frequency range as it is.

In this case, the minimum audible level (hereinafter, the level is called a threshold level) needs to be set to be lowered by 20 dB. In contrast, when the signal of 80 dB of an average level is reproduced by 80 dB S.P.L. under the threshold level, is set before, as shown in FIGS. 3(a) and 3(b), there remains signals which cannot be actually audible.

As described above, a conventional method has problems that too many signals are lost when the level of reproduction is set higher, and in contrast, unnecessary signals are left when the level of reproduction is set lower.

SUMMARY OF THE INVENTION

An object of the present invention is to provide a method of coding an audio signal, capable of effectively coding the audio signal by adaptively or variably controlling a threshold level as a set value of the minimum audible level corresponding to an actual signal level previously observed.

In order to achieve the above object, the method of the present invention comprises calculating sum total of a power of an input audio signal corresponding to signals of the time axis or corresponding to coefficient values which are transferred from the time axis signals to the frequency axis by using an orthogonal transformation, adaptively controlling a minimum audible level on the frequency axis by using the sum total power which is previously calculated, canceling the coefficient values under the minimum audible level, and quantizing the coefficient values on or over the minimum audible level.

By this invention, the threshold level of the minimum audible level is adaptively controlled corresponding to an observed level of an input audio signal.

As is apparent from the above description, the present invention has the effect that even if the input audio signal has various power levels, it is possible to usually set the adaptive audible value (the threshold level), thereby effectively reducing the coding amount.

Furthermore, it is a feature that the coding amount is smoothed at the same time as coding by means of keeping a substantially fixed dynamic range of each interval (the orthogonal transformation length).

DESCRIPTION OF THE PREFERRED EMBODIMENTS

There will now be described in detail a coding unit and method of coding an audible signal by using an adaptive orthogonal transformation according to an embodiment of the present invention with reference to the attached drawings.

Figure 1:
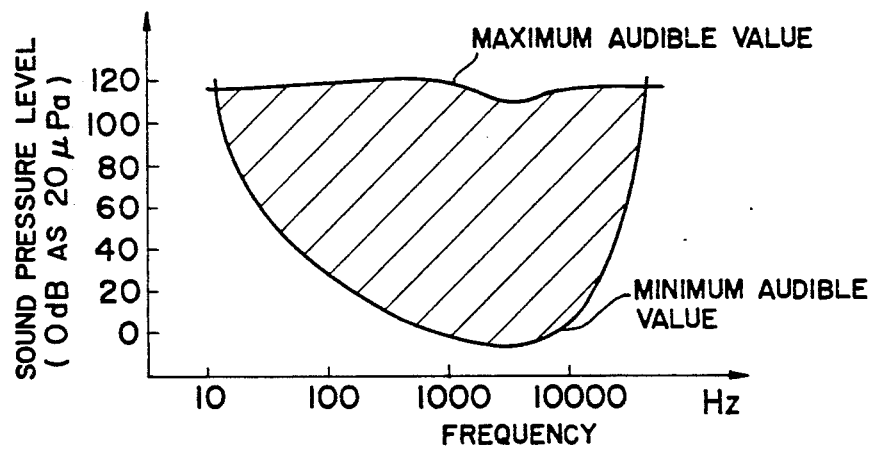
FIG. 1 is a characteristic diagram showing the typical audible range of a person having normal hearing ability.
Figure 2A:
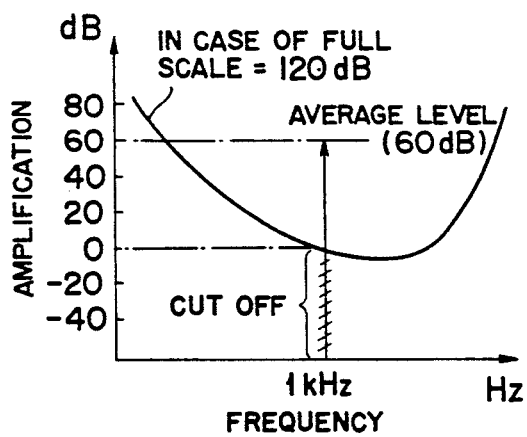
FIGS. 2(a) 2(b) are diagrams showing how a signal being inaudible at coding results in a signal being audible at reproduction.
Figure 2B:
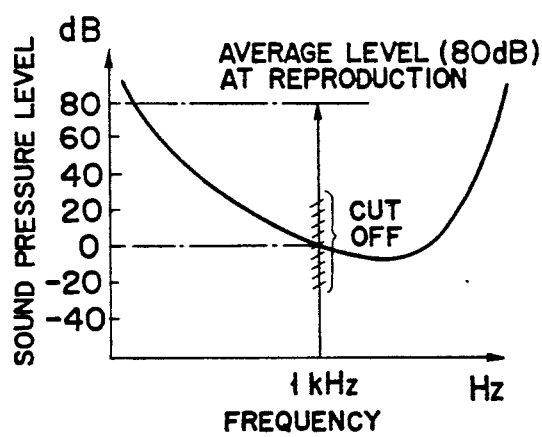
Figure 3A:
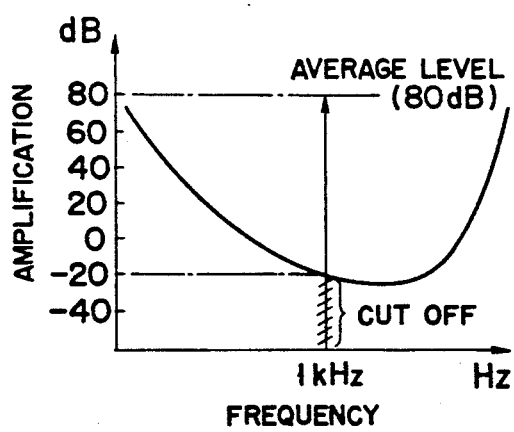
FIGS. 3(a) and 3(b) are diagrams showing how a signal being audible at coding results in a signal being inaudible at reproduction.
Figure 3B:
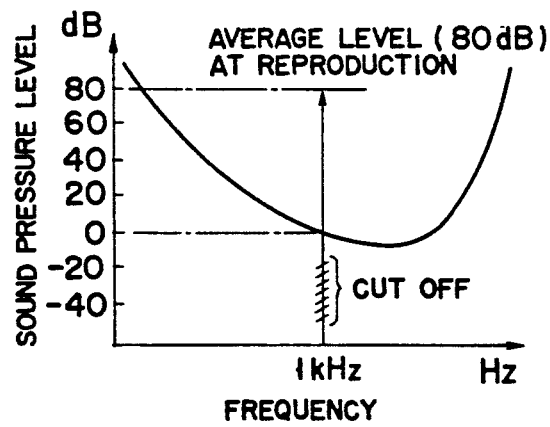
Figure 4:
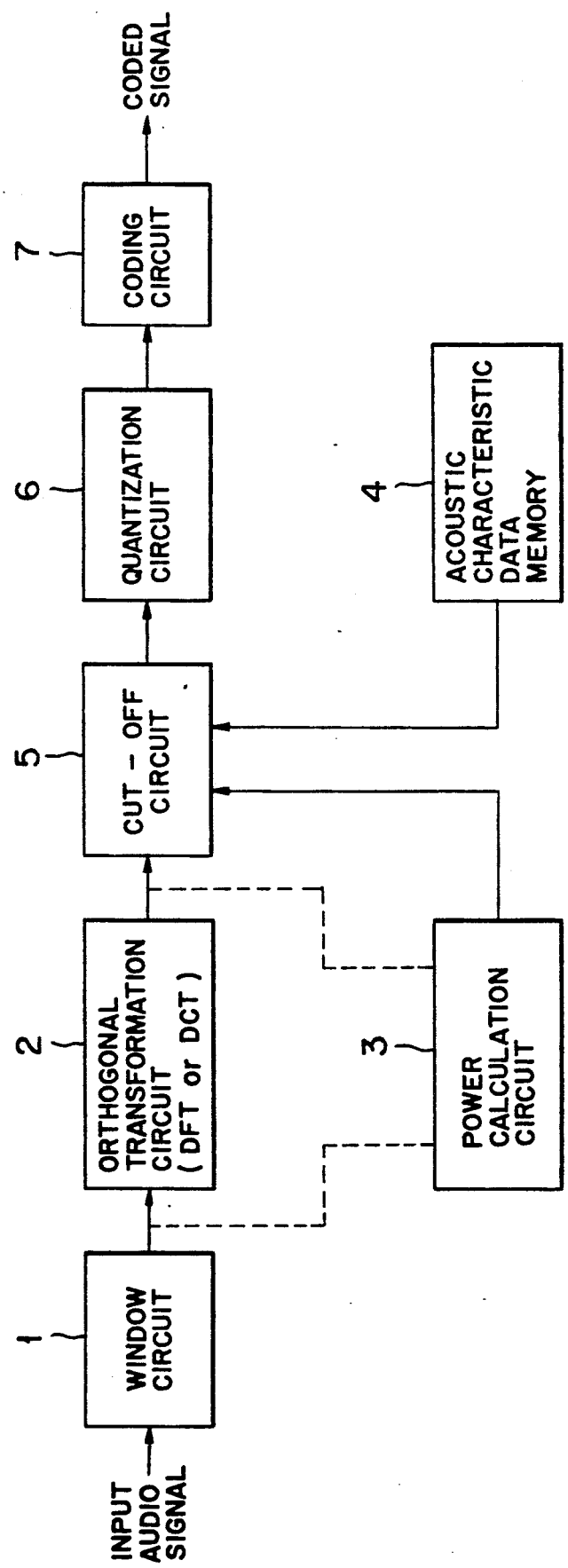
FIG. 4 is a block diagram showing a coding unit for utilizing a coding method of the present invention.
Figure 5:
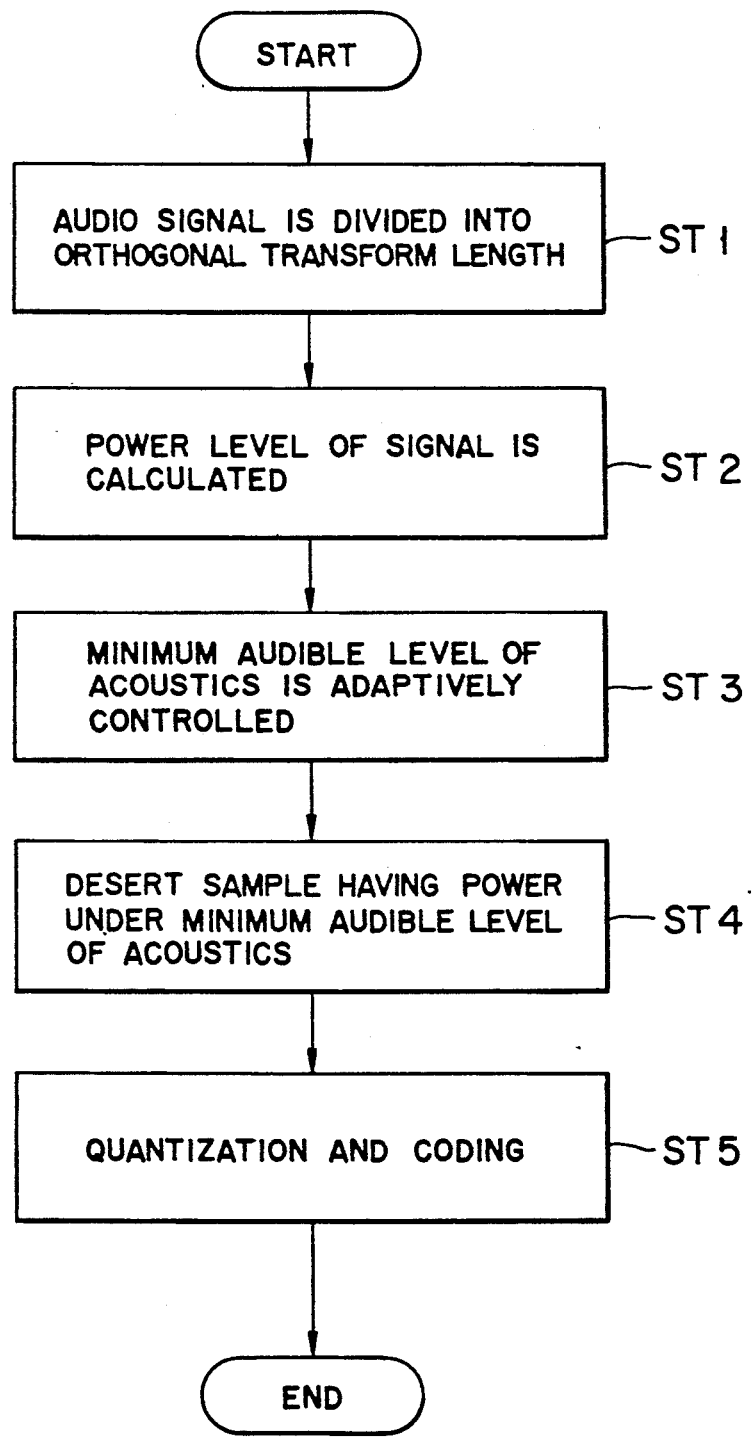
FIG. 5 is a flow chart showing a method of coding an audio signal by using an adaptive orthogonal transformation according to an example of the present invention.

FIG. 4 is a block diagram showing a coding unit for utilizing a coding method of this invention, and FIG. 5 is a flow chart showing an operational procedure of the coding method of this invention.

CONFIGURATION OF THE CODING UNIT

The coding unit for utilizing this invention comprises, s shown in FIG. 4, a window circuit 1 for dividing an input audio signal into successive blocks having a predetermined length, an orthogonal transformation circuit 2 such as the discrete cosine transformation (DCT) or the discrete Fourier transformation (DFT), a power calculation circuit 3 for calculating a power level of the input audio signal, an acoustic characteristic data memory 4 for storing acoustic characteristic data, a cut-off circuit 5 for cutting off a signal component under a threshold level, a quantization circuit 6 for quantizing a remaining component without the cut-off component, and a coding circuit 7 for coding the remaining component.

PROCEDURE OF THE CODING METHOD

The coding method is performed by the following steps as shown in FIG. 5.

In the window circuit 1, the input audio signal is divided into successive blocks having a predetermined length for orthogonal transformation and supplied to the orthogonal transformation circuit 2 (DCT or DFT).

Each block so divided is orthogonally transformed in the transformation circuit 2 and supplied to the cut-off circuit 5. The power calculation circuit 3 receives signals supplied from the window circuit 1 coefficient after transforming which is supplied from orthogonal transform circuit 2, thereby calculating power values corresponding to data on one block length or over the length or more (refer to step ST2).

The power level calculated above is supplied to the cut-off circuit 5 with the data output from the acoustic data memory 4.

Figure 6:
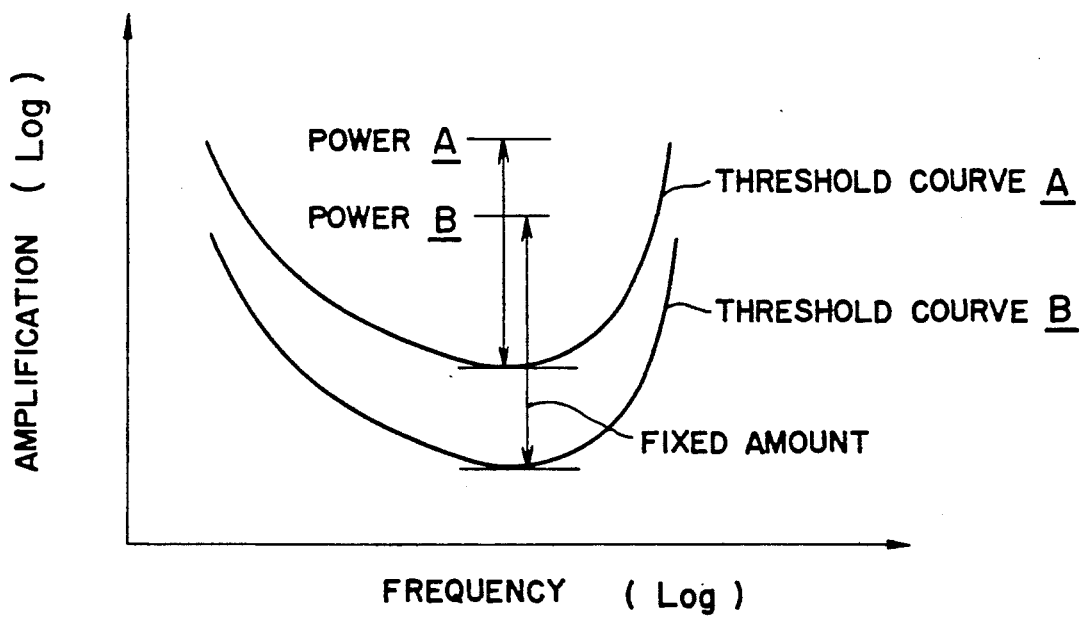
FIG. 6 is a characteristic diagram showing the concept for processing according to the present invention.

The minimum audible level (a threshold level) is adaptively controlled on a frequency axis after the orthogonal transformation (refer to step ST3). As will be described later, the cut-off circuit 5 controls the threshold levels A and B corresponding to the input power level A and B, respectively, as shown in FIG. 6. Samples (transformed coefficients) having a power under the threshold level are omitted as ineffective data (refer to step ST4). The threshold level A or B is calculated on the time axis or the frequency axis.

As a result, only samples having a power level over the threshold level are quantized in the circuit 6 and coded by the coding circuit 7, thereby outputting a coded signal (refer to step ST5).

The method can prevent the tone quality from deteriorating by cutting off the signal too much, and the code from increasing by remaining unnecessary signals, thereby adaptively processing the signals by cutting off the samples having values under the threshold level, whether or not the level of signals are.

Furthermore, as a dynamic range in the processed duration is usually kept at the substantially fixed level, it is possible to reduce the variation of the coding rate in each duration.

CALCULATION OF POWER OF INPUT SIGNAL

The signal power is calculated for a period equal to one block length or more. If the period is lengthened, the coding is late for steep changes of the signal power, so that it is desirable to adopt the method in which the orthogonal transformation length is used as it is. The calculation of the signal power may be performed on the frequency axis after the orthogonal transformation or on the corresponding time axis before the orthogonal transformation.

In the former case of the frequency axis, when a point number of the orthogonal transformation is denoted as N, the duration power $P_i$ is obtained by an equation (1) as follows:

$$P_i = \sum_{j=1}^{N} a_{ij}^2 \qquad (1)$$

where $a_{ij}$ is represented by a coefficient value corresponding to one of the order j in the duration i.

It is unnecessary to define the threshold level at each frequency. An example in which the threshold level is defined by three straight lines approximating a curve defining the threshold level in the duration from 20 Hz to 20 kHz, is shown in FIG. 7.

Figure 7:
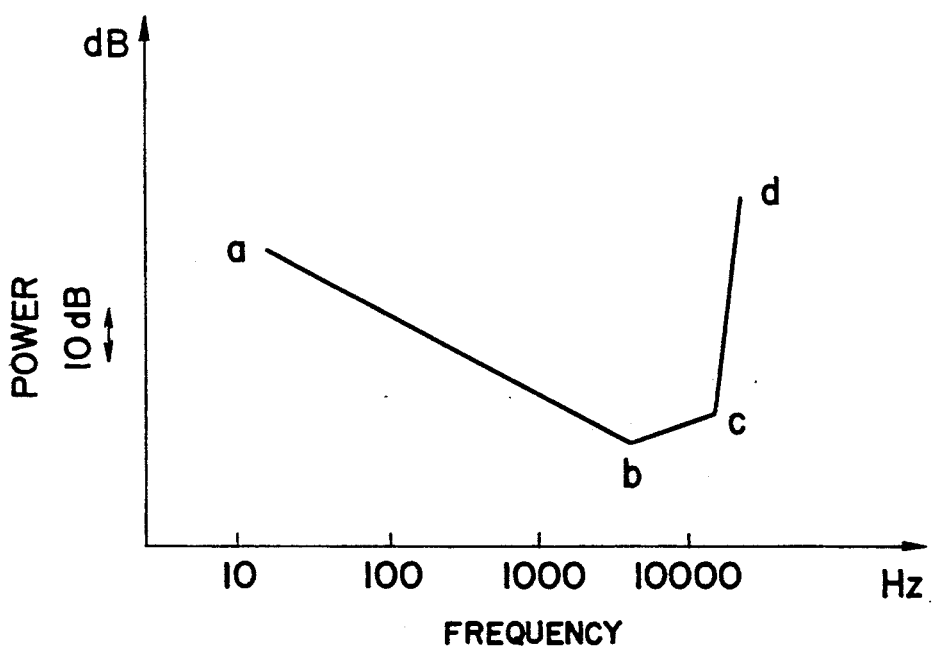
FIG. 7 is a polygonal line graph showing a threshold power level as a function of frequency.

In FIG. 7, when frequencies of nodes b and c are respectively set 4 kHz and 14 kHz, obliques of a-b, b-c and c-d are respectively determined as −6.5 db/oct, 5 db/oct and 100 db/oct.

DETERMINATION OF THE THRESHOLD LEVEL

The threshold level at 1 kHz is defined as follow:

$$(Th)_{1\,kHz} = 10 \log_{10} P_i - D[dB] \qquad (2),$$

thereby setting the entire threshold level corresponding thereto, where D is determined experimentally.

Next, each power of samples in the respective durations are compared with the threshold level determined above. If the sample power is on or under the threshold level, the power under the threshold is omitted.

THE FEATURE OF THIS METHOD

The feature of the present invention will be explained with reference to FIGS. 2(a), 2(b), 3(a) and 3(b). As is apparent from these figures, it is suitable to select 80 dB as "D" at 1 kHz.

However, a power $P_i$ in a predetermined duration is actually distributed above and below the average level of the figure, and the threshold level rises and falls in each duration unit according thereto. As considered, the influence of samples so omitted is approximated with the condition shown in FIG. 3(a) when the power is under the average level, and shown in FIG. 3(b) when the power is over the average level. In the former case, the tone quality of the reproduced sound does not deteriorate, and in the latter case, as the total power is sufficiently large in actual, a fine signal is masked so that the quality does not deteriorate.

Furthermore, the code rate decreases because unnecessary signal samples are omitted in the former case. However, it can be improved by setting a suitable under limit value in the manner that the threshold level does not fall under a predetermined value. In general, there is no great adverse influence on the rise and fall of the threshold level of each duration.

As the result of the estimation of various sound source, the concrete value of D[dB] of the equation (2) is set to "D=80 to 70 [dB]" in an ordinary hearing level, thereby achieving an object of this invention, namely, the quality of reproduced sound does not deteriorate.

Furthermore, the limit value of the threshold level may be set to "$10 \log_{10} a^2 = -40$ to $-50$" at the frequency of 1 kHz.

What is claimed is:

1. A method of coding an audio signal by using an orthogonal transformation, comprising the steps of:
    performing an orthogonal transformation on an input audio signal having a predetermined transform length;
    calculating a sum total of a power of transformed coefficients in a range of or over the transform length;

adaptively controlling a minimum audible level which is defined in an audible frequency range corresponding to said sum total of the power;

excepting coefficients having a power value under the minimum audible level determined from orthogonally transformed coefficients; and quantizing remaining coefficients.

2. A method of coding an audio signal by using an adaptive orthogonal transformation, comprising the steps of:

performing an orthogonal transformation on an input audio signal having a predetermined transform length;

calculating a sum total of a power of the input audio signal in a time duration of or over an orthogonal transform length;

adaptively controlling a minimum audible level which is defined in an audible frequency range corresponding to said sum total of the power;

excepting coefficients having a power value under the minimum audible level determined from orthogonally transformed coefficients; and quantizing remaining coefficients.

3. A coding unit for coding an input audio signal by using an adaptive orthogonal transformation, comprising:

window means for dividing an input audio signal into blocks having a predetermined length for an orthogonal transformation and for setting a minimum audible level from said input audio signal;

orthogonal transformation means for transforming said audio signal from said window means by using said orthogonal transformation;

power calculation means for calculating a power level of said audio signal divided by said window means;

memory means for storing acoustic characteristic data;

cut-off means connected to outputs of said orthogonal transformation means, said power calculation means and said memory means for excepting a signal component under said minimum audible level corresponding to said calculated value from said power calculation means and said acoustic characteristic data form said memory means and for outputting a remaining signal component;

quantization means for quantizing said remaining signal component outputted from said cut-off means; and coding means for coding said audio signal after quantizing said signal component and for outputting a coded signal to a decoding unit.

* * * * *